(12) United States Patent
Rizet

(10) Patent No.: US 8,913,410 B2
(45) Date of Patent: Dec. 16, 2014

(54) CONVERTER DEVICE FOR AN UNINTERRUPTIBLE POWER SUPPLY

(75) Inventor: Corentin Rizet, Francin (FR)

(73) Assignee: MGE UPS, Saint Ismier (FR)

( * ) Notice: Subject to any disclaimer, the term of this patent is extended or adjusted under 35 U.S.C. 154(b) by 431 days.

(21) Appl. No.: 13/064,652

(22) Filed: Apr. 6, 2011

(65) Prior Publication Data

US 2011/0260543 A1    Oct. 27, 2011

(30) Foreign Application Priority Data

Apr. 26, 2010    (FR) ...................................... 10 01769

(51) Int. Cl.
     *H02M 7/537*      (2006.01)
     *H02M 7/48*      (2006.01)
     *H02M 1/34*      (2007.01)

(52) U.S. Cl.
     CPC . *H02M 1/34* (2013.01); *H02M 7/48* (2013.01)
     USPC .............................. 363/131; 363/16; 363/132

(58) Field of Classification Search
     USPC ............ 363/95, 98, 97, 131, 89, 127, 132, 16
     See application file for complete search history.

(56) References Cited

U.S. PATENT DOCUMENTS

| | | | | |
|---|---|---|---|---|
| 6,353,547 | B1 * | 3/2002 | Jang et al. ...................... | 363/132 |
| 7,126,833 | B2 * | 10/2006 | Peng .............................. | 363/132 |
| 7,499,296 | B2 * | 3/2009 | Baudesson et al. ............. | 363/37 |
| 7,791,904 | B2 * | 9/2010 | Zhang et al. .................... | 363/17 |
| 2005/0105314 | A1 | 5/2005 | Nielsen .......................... | 363/132 |
| 2006/0050537 | A1 * | 3/2006 | Zeng et al. ..................... | 363/16 |
| 2006/0221653 | A1 * | 10/2006 | Lai et al. ......................... | 363/37 |
| 2008/0067872 | A1 * | 3/2008 | Moth ............................... | 307/66 |
| 2010/0039843 | A1 * | 2/2010 | Takizawa ....................... | 363/131 |

\* cited by examiner

*Primary Examiner* — Matthew Nguyen
*Assistant Examiner* — Gustavo Rosario Benitez
(74) *Attorney, Agent, or Firm* — Steptoe & Johnson LLP

(57) ABSTRACT

A converter device for an uninterruptible power supply, the device having first and second main switching units connected to first and second voltage lines of a first type and each equipped with a first main switch; a main switching point connected to a voltage line of a second type and connected to the first and second main switching units; and a third main switch common to the first and second main switching units, and connected between the main switching point and a third voltage line of the first type; first, second and third capacitors connected between the main switching point and each of the first, second and third voltage lines of the first type; a first auxiliary switching unit connected by individual auxiliary switches between the first and second voltage lines of the first type, and a first auxiliary switching point; a second auxiliary switching unit connected between the first, second and third voltage lines of the first type, and a second auxiliary switching point; and a transformer having windings each having one free end and one end connected to the main switching point, with the free ends respectively connected to the first and second auxiliary switching points.

14 Claims, 15 Drawing Sheets

CONVERTER DEVICE FOR AN UNINTERRUPTIBLE POWER SUPPLY

BACKGROUND OF THE INVENTION

The invention relates to the field of converters, such as boost converters and buck converters for example, as well as rectifiers and inverters, for example those used in uninterruptible power supplies, in particular in high-power uninterruptible power supplies, i.e. with a power generally comprised between about 100 and 500 kVA.

The invention relates more particularly to a converter device enabling first electric voltages available on a first, second and third voltage line of a first type to be transformed into a voltage on a voltage line of a second type, in either direction, said device comprising:
- a first main switching unit connected to said first voltage line of the first type and equipped with a first main switch,
- a second main switching unit connected to said second voltage line of the first type and equipped with a second main switch,
- a main switching point connected to said voltage line of the second type and connected to said first and said second main switching unit, and
- a third main switch common to said first and to said second main switching unit, said third main switch being connected between said main switching point and the third voltage line of the first type.

The invention also relates to an uninterruptible power supply comprising a power supply input on which an AC input voltage is applied, a rectifier connected to said input, two substantially DC voltage lines of opposite signs connected on output of said rectifier, and an inverter connected to said substantially DC voltage lines and comprising an output designed to supply a secured voltage.

STATE OF THE ART

Inverters are being developed to improve their efficiency and to reduce noise annoyance generated by switching frequencies that are often low, around a few thousand hertz. In this context, it has been shown that it was interesting to use inverters presenting topologies on several levels, generally three levels.

With reference to FIG. 1 according to the prior art, a three-level inverter represented under reference number 1 enables electric voltage levels $U/2$, $-U/2$, UREF available on a first, second and third voltage line of a first type P, N, REF to be transformed into a voltage VA on a voltage line of a second type A, in either direction. In the case represented, the voltage lines of the first type are lines having substantially DC voltage levels and the voltage lines of the second type are lines where the voltage is AC. In a direction corresponding to operation in inverter mode, the voltage VA and current IA are AC and are obtained by filtering pulses on a main switching point CP from three substantially DC voltage levels $U/2$, $-U/2$, UREF. In the other direction corresponding to operation as a rectifier, the substantially DC voltage levels $U/2$, $-U/2$, UREF are obtained from the AC voltage VA and current IA. Filtering means used comprise an inductance LF connected between the main switching point CP and the voltage line of second type A. Filtering means also comprise a capacitor CF which is connected between the AC voltage output VA and a voltage reference point presenting the same electric potential as the reference voltage line REF.

The converter represented in FIG. 1 comprises two main switching units UC1, UC2 controlled by means of a control unit, not represented. The switching units UC1, UC2 respectively comprise a positive DC voltage input and a negative DC voltage input respectively connected to the first and second voltage line of first type P, N. Each switching unit UC1, UC2 is connected on one side to the first or second voltage line of first type P, N and to the third voltage line of first type, and on the other side to the main switching point CP. First switching unit UC1 comprises a first main switch K1 connected between the first voltage line of first type P and the main switching point CP. In the same way, the second switching unit UC2 comprises a second main switch K2 connected between the second voltage line of first type N and the main switching point CP. The converter comprises a third main switch K3 common to the first and second switching unit and connected between the main switching point CP and the third voltage line of first type REF. Each of the main switches K1, K2, K3 can comprise at least one transistor and at least one diode connected in parallel on said transistor and oriented so as to be conducting when said transistor is reverse-biased.

When the main switch K1, respectively K2, is closed, the voltage on the main switching point CP is substantially equal to the DC voltage $+U/2$, respectively $-U/2$, available on the first voltage line of first type P, respectively the second voltage line of first type N. The turned-on state of the main switch K1, respectively K2, thus corresponds to a first switched state of the switching unit UC1, respectively UC2. In this first switched state, the main switch K1, respectively K2, can transfer power from the first voltage line of first type P, respectively from the second voltage line of first type N, to the main switching point CP.

When the main switch K1, respectively K2, is open, the third main switch K3 enables the voltage on said main switching point CP to be at a value substantially equal to the voltage available on said third voltage line, i.e. a reference voltage, which corresponds to a second switched state of the switching unit UC1, respectively UC2.

With reference to FIG. 2 according to the prior art, another three-level inverter is represented under reference number 2. This converter presents a topology referred to as Neutral Point Clamped, which can be abbreviated to "NPC". This converter also enables substantially DC electric voltage levels $U/2$, $-U/2$, UREF on a first, second and third voltage line of a first type P, N, REF to be transformed into an AC voltage VA on a voltage line of a second type A, in either direction.

The converter represented in FIG. 2 also comprises two main switching units UC1, UC2. The switching units UC1, UC2 respectively comprise a positive DC voltage input and a negative DC voltage input respectively connected to the first and second voltage line of the first type P, N. First switching unit UC1 comprises a first main switch K1 connected between the first voltage line of the first type P and the main switching point CP. In the same way, the second switching unit UC2 comprises a second main switch K2 connected between the second voltage line of first type N and the main switching point CP. The converter comprises a third main switch K3 common to the first and second switching unit and connected between the main switching point CP and the third voltage line of first type REF. In the converter represented in FIG. 2, the first main switch K1 comprises:
- a first transistor T11 connected in such a way as to make the current of the first voltage line of the first type flow to the main switching point CP,
- a second transistor T12 connected in series with said first transistor and oriented in the same direction, a first diode D11 connected in parallel on said first transistor and oriented so as to be conducting when said first transistor is reverse-biased, and a second diode D12 connected in parallel on said second transistor and oriented so as to be conducting when said second transistor is reverse-biased.

In the same way, the second main switch K2 comprises:

a first transistor T22 oriented to make the current flow from the main switching point CP to the second voltage line of the first type, a second transistor T21 connected in series with said first transistor and oriented in the same direction, a first diode D22 connected in parallel on said first transistor and oriented so as to be conducting when said first transistor is reverse-biased, and a second diode D21 connected in parallel on said second transistor and oriented so as to be conducting when said second transistor is reverse-biased.

The transistor T12, T21 of each main switching unit UC1, UC2, when it is on, essentially enables switching of said switching unit to be activated according to the sign of the AC voltage VA. The transistor T12, T21 of each switching unit UC1, UC2 among other things enables switching to be activated from the first switched state to a second switched state of said switching unit when the AC voltage VA is of the same sign as the voltage available on input P, N of said switching unit.

The third main switch K3 for its part comprises the second transistors T12, T21 of the first and second main switches K1, K2, and the second diodes D12, D21 connected in parallel on said second transistors. The third main switch further comprises diodes DP, DN connected between the third voltage line of the first type, i.e. the reference voltage line REF, and the connection lines between the first and second transistors T11, T22, T12, T21 of the first and second main switches K1, K2. More precisely, the second transistor T12, respectively T21, and the diode DP, respectively DN, of the third main switch K3 are connected in series between the third voltage line of the first type, i.e. reference voltage line REF, and the main switching point CP. The diode DP, DN enables switching to take place from the first switched state to the second switched state when the first transistor T11, T22 is turned-off. When the second transistor T12, T21 is on, this second switched state associated with turn-off of the first transistor T11, T22 enables a voltage substantially equal to the voltage on the third voltage line of the first type, i.e. reference voltage UREF, to be obtained on the main switching point CP. In this way, the first transistor T11, T22 of the first or second main switch supplies pulses, on the main switching point CP, having an amplitude varying between the value of the voltage on the first or second voltage line of the first type in the first switched state, and a value of the voltage on the third voltage line of the first type in the second switched state.

One shortcoming of converters of the prior art is related to power losses when switching of the main switches of their switching units takes place. French Patent application FR2936113 describes a converter as described in the foregoing to which a switching aid circuit has been added enabling soft switchings to be obtained, in particular by closing the main switches of their main switching units under zero voltage and obtaining full demagnetization of said switching aid circuits. However these switching aid circuits do not enable soft switching to be achieved on all the main switches of the main switching units, and in particular in the case where the converted power contains a non-negligible reactive component.

SUMMARY OF THE INVENTION

The object of the invention is to provide a solution to the problems of converters of the prior art by proposing a converter device enabling electric voltage levels available on a first, second and third voltage line of a first type to be transformed into a voltage on a voltage line of a second type, in either direction, said device comprising:

a first main switching unit connected to said first voltage line of the first type and equipped with a first main switch, a second main switching unit connected to said second voltage line of the first type and equipped with a second main switch, a main switching point connected to said voltage line of the second type and connected to said first and to said second main switching unit, and a third main switch common to said first and to said second main switching unit, said third main switch being connected between said main switching point and the third voltage line of the first type, said converter device being characterized in that it comprises:

a first, second and third capacitor connected between said main switching point and respectively said first, said second and said third voltage line of the first type, a first auxiliary switching unit connected between the first voltage line of the first type, the second voltage line of the first type, and a first auxiliary switching point, a second auxiliary switching unit connected between the first voltage line of the first type, the second voltage line of the first type, the third voltage line of the first type and a second auxiliary switching point, and a transformer equipped with windings provided with two free ends and with two ends connected to a common point, said common point being connected to said main switching point, the two free ends being respectively connected to said first auxiliary switching point and to said second auxiliary switching point.

The first auxiliary switching unit preferably comprises:

a first auxiliary switch of said first auxiliary switching unit connected between the first voltage line of the first type and the first auxiliary switching point, and a second auxiliary switch of said first auxiliary switching unit connected between the second voltage line of the first type and said first auxiliary switching point.

The second auxiliary switching unit preferably comprises:

a first auxiliary switch of said second auxiliary switching unit connected between the first voltage line of the first type and the second auxiliary switching point, a second auxiliary switch of said second auxiliary switching unit connected between the second voltage line of the first type and said second auxiliary switching point, and a third auxiliary switch of said second auxiliary switching unit connected between the third voltage line of the first type and said second auxiliary switching point.

According to one embodiment, the converter device is characterized in that:

the first auxiliary switch of the second auxiliary switching unit is a diode oriented so as to transfer power from the second auxiliary switching point to the first voltage line of the first type, and the second auxiliary switch of said second auxiliary switching unit is a diode oriented so as to transfer power from the second voltage line of the first type to said second auxiliary switching point.

According to one embodiment, the converter device is characterized in that:
- the first main switch is a transistor connected to the first voltage line of the first type and oriented so as to transfer power from said line to the main switching point,
- the second main switch is a diode connected to the second voltage line of the first type and oriented to transfer power from said line to the main switching point,
- the third main switch comprises a transistor oriented to transfer power from the third voltage line of the first type to said main switching point and a diode connected in series with said transistor and oriented in the same direction,
- the first auxiliary switch of the first auxiliary switching unit is a transistor oriented to transfer power from the first voltage line of the first type to the first auxiliary switching point,
- the second auxiliary switch of said first auxiliary switching unit is a diode oriented to transfer power from the second voltage line of the first type to said first auxiliary switching point,
- the first auxiliary switch of the second auxiliary switching unit is a diode oriented to transfer power from the second auxiliary switching point to the first voltage line of the first type,
- the second auxiliary switch of said second auxiliary switching unit is a diode oriented to transfer power from the second voltage line of the first type to said second auxiliary switching point,
- the third auxiliary switch of said second auxiliary switching unit comprises a transistor oriented to transfer power from the third voltage line of the first type to said second auxiliary switching point and a diode connected in series with said transistor and oriented in the same way.

According to one embodiment, the converter device is characterized in that:
- the first main switch is a diode connected to the first voltage line of the first type and oriented to transfer power from the main switching point to said line,
- the second main switch is a transistor connected to the second voltage line of the first type and oriented to transfer power from said main switching point to said line,
- the third main switch comprises a transistor oriented to transfer power from said main switching point to the third voltage line of the first type and a diode connected in series with said transistor and oriented in the same way,
- the first auxiliary switch of the first auxiliary switching unit is a diode oriented to transfer power from the first auxiliary switching point to the first voltage line of the first type,
- the second auxiliary switch of said first auxiliary switching unit is a transistor oriented to transfer power from said first auxiliary switching point to the second voltage line of the first type,
- the first auxiliary switch of the second auxiliary switching unit is a diode oriented to transfer power from the second auxiliary switching point to the first voltage line of the first type,
- the second auxiliary switch of said second auxiliary switching unit is a diode oriented to transfer power from the second voltage line of the first type to said second auxiliary switching point,
- the third auxiliary switch of said second auxiliary switching unit comprises a transistor oriented to transfer power from said second auxiliary switching point to the third voltage line of the first type and a diode connected in series with said transistor and oriented in the same way.

According to one embodiment, the converter device is characterized in that:
- the first main switch is a transistor connected to the first voltage line of the first type and oriented to transfer power from said line to the main switching point,
- the second main switch is a transistor connected to the second voltage line of the first type and oriented to transfer power from said main switching point to said line,
- the third main switch comprises two transistors oriented in opposite directions and two diodes connected in parallel on respectively said transistors, each of said diodes being oriented to be conducting when the transistor in parallel to which it is connected is reverse-biased,
- the first auxiliary switch of the first auxiliary switching unit is a transistor oriented to transfer power from the first voltage line of the first type to the first auxiliary switching point,
- the second auxiliary switch of said first auxiliary switching unit is a transistor oriented to transfer power from said first auxiliary switching point to the second voltage line of the first type,
- the first auxiliary switch of the second auxiliary switching unit is a diode oriented to transfer power from the second auxiliary switching point to the first voltage line of the first type,
- the second auxiliary switch of said second auxiliary switching unit is a diode oriented to transfer power from the second voltage line of the first type to said second auxiliary switching point,
- the third auxiliary switch of said second auxiliary switching unit comprises two transistors oriented in opposite directions and two diodes connected in parallel on respectively said transistors, each of said diodes being oriented to be conducting when the transistor in parallel to which it is connected is reverse-biased.

According to one embodiment, the converter device is characterized in that:
- the first main switch is a diode connected to the first voltage line of the first type and oriented to transfer power from the main switching point to said line,
- the second main switch is a diode connected to the second voltage line of the first type and oriented to transfer power from said line to said main switching point,
- the third main switch comprises two transistors oriented in opposite directions and two diodes connected in parallel on respectively said transistors, each of said diodes being oriented to be conducting when the transistor in parallel to which it is connected is reverse-biased,
- the first auxiliary switch of the first auxiliary switching unit is a diode oriented to transfer power from the first auxiliary switching point to the first voltage line of the first type,
- the second auxiliary switch of said first auxiliary switching unit is a diode oriented to transfer power from the second voltage line of the first type to said first auxiliary switching point,
- the first auxiliary switch of the second auxiliary switching unit is a diode oriented to transfer power from the second auxiliary switching point to the first voltage line of the first type,
- the second auxiliary switch of said second auxiliary switching unit is a diode oriented to transfer power from the second voltage line of the first type to said second auxiliary switching point, the third auxiliary switch of said second auxiliary switching unit comprises two transistors oriented in opposite directions and two diodes connected in parallel on respectively said transistors, each of said diodes being oriented to be conducting when the transistor in parallel to which it is connected is reverse-biased.

According to one embodiment, the converter device is characterized in that:

the first main switch comprises a transistor oriented to transfer power from the first voltage line of the first type to the main switching point and a diode connected in parallel on said transistor and oriented to be conducting when said transistor is reverse-biased, the second main switch comprises a transistor oriented to transfer power from the main switching point to the second voltage line of the first type and a diode connected in parallel on said transistor and oriented to be conducting when said transistor is reverse-biased, the third main switch comprises two transistors oriented in opposite directions and two diodes connected in parallel on respectively said transistors, each of said diodes being oriented to be conducting when the transistor in parallel to which it is connected is reverse-biased, the first auxiliary switch of the first auxiliary switching unit comprises a transistor oriented to transfer power from the first voltage line of the first type to the first auxiliary switching point and a diode connected in parallel on said transistor and oriented to be conducting when said transistor is reverse-biased, the second auxiliary switch of said first auxiliary switching unit comprises a transistor oriented to transfer power from said first main switching point to the second voltage line of the first type and a diode connected in parallel on said transistor and oriented to be conducting when said transistor is reverse-biased, the first auxiliary switch of the second auxiliary switching unit is a diode oriented to transfer power from the second auxiliary switching point to the first voltage line of the first type, the second auxiliary switch of said second auxiliary switching unit is a diode oriented to transfer power from the second voltage line of the first type to said second auxiliary switching point, the third auxiliary switch of said second auxiliary switching unit comprises two transistors oriented in opposite directions and two diodes respectively connected in parallel on said transistors, each of said diodes being oriented to be conducting when the transistor in parallel to which it is connected is reverse-biased.

Preferably:

the first main switch comprises a first transistor connected to the first voltage line of the first type and oriented to transfer power from said line to the main switching point, a second transistor connected in series with said first transistor and oriented in the same direction, a first and second diode respectively connected in parallel on said first and said second transistor, each of said diodes being oriented to be conducting when the transistor in parallel to which it is connected is reverse-biased, the second main switch comprises a first transistor connected to the second voltage line of the first type and oriented to transfer power from said main switching point to said line, a second transistor connected in series with said first transistor and oriented in the same direction, a first and second diode respectively connected in parallel on said first and said second transistor, each of said diodes being oriented to be conducting when the transistor in parallel to which it is connected is reverse-biased, the third main switch comprises said second transistors, said second diodes and diodes connected between the third voltage line of the first type and connection lines between said first and said second transistors.

Preferably:

the first auxiliary switch of the first auxiliary switching unit comprises a transistor oriented to transfer power from the first voltage line of the first type to the first auxiliary switching point and a diode connected in parallel on said transistor and oriented to be conducting when said transistor is reverse-biased, the second auxiliary switch of said first auxiliary switching unit comprises a transistor oriented to transfer power from said first auxiliary switching point to the second voltage line of the first type and a diode connected in parallel on said transistor and oriented to be conducting when said transistor is reverse-biased.

Preferably:

the first auxiliary switch of said second auxiliary switching unit comprises a first diode connected to the first voltage line of the first type oriented to transfer power from the second auxiliary switching point to said line, a first transistor connected in series with said first diode and oriented in an opposite direction, and a second diode connected in parallel on said first transistor and oriented to be conducting when said transistor is reverse-biased, the second auxiliary switch of said second auxiliary switching unit comprises a diode connected to the second voltage line of the first type oriented to transfer power from said line to said second auxiliary switching point, a first transistor connected in series with said first diode and oriented in an opposite direction, and a second diode connected in parallel on said first transistor and oriented to be conducting when said transistor is reverse-biased, the third switch of said second auxiliary switching unit comprises said first transistors, said second diodes and diodes connected between the third voltage line of the first type and connection lines between said first and said second diodes.

The transformer windings preferably have a substantially equal number of turns.

The invention also relates to an uninterruptible power supply comprising a power supply input on which an AC input voltage is applied, a rectifier connected to said input, two substantially DC voltage lines of opposite signs connected on output of said rectifier, an inverter connected to said substantially DC voltage lines and comprising an output designed to supply a secured voltage, said power supply being characterized in that said inverter is a converter device as described in the foregoing and supplies a secured AC voltage from substantially DC voltages.

BRIEF DESCRIPTION OF THE FIGURES

Other advantages and features will become more clearly apparent from the following description of particular embodiments of the invention given for non-restrictive example purposes only and represented in the appended figures.

DETAILED DESCRIPTION OF AN EMBODIMENT

Figure 1:
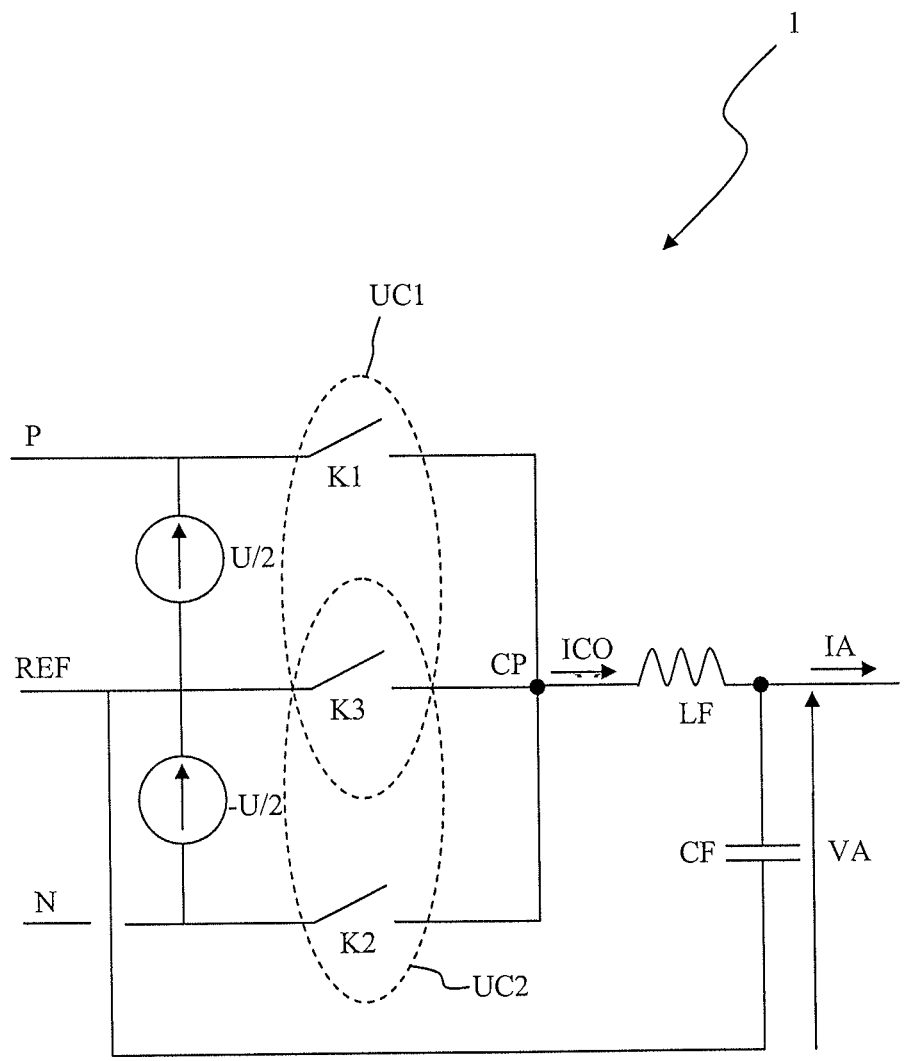
FIG. 1 represents a conventional model of a three-level converter.
Figure 3:
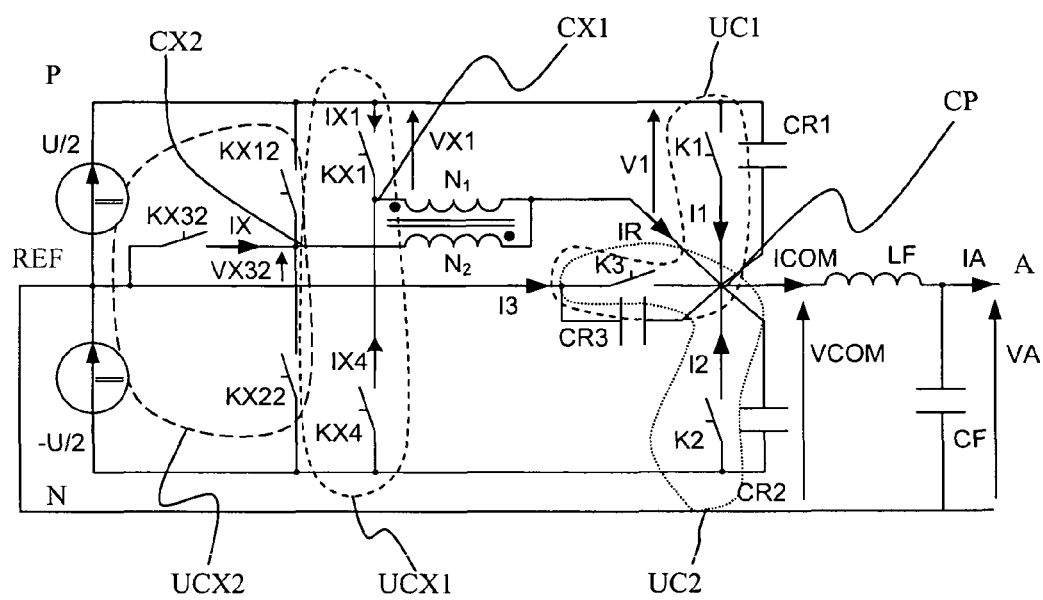
FIG. 3 represents a model of a three-level converter according to the invention.

With reference to FIG. 3, the converter device comprises the elements represented in FIG. 1 under the same reference numbers.

The converter device represented in FIG. 3 further comprises a first, second and third capacitor CR1, CR2, CR3 connected between the main switching point CP and respectively the first, second and third voltage line of the first type P, N, REF. These capacitors dampen the voltages when the main switches K1, K2, K3 open.

The converter device represented in FIG. 3 further comprises a first two-level auxiliary switching unit UCX1 connected between the first voltage line of the first type P, the second voltage line of the first type N, and a first auxiliary switching point CX1. This first auxiliary switching unit UCX1 comprises a first auxiliary switch KX1 connected between the first voltage line of the first type P and the first auxiliary switching point CX1, and a second auxiliary switch KX4 connected between the second voltage line of the first type N and said first auxiliary switching point CX1.

The converter device represented in FIG. 3 further comprises a second three-level auxiliary switching unit UCX2 connected between the first voltage line of the first type P, the second voltage line of the first type N, the third voltage line of the first type REF and a second auxiliary switching point CX2. This second auxiliary switching unit UCX2 comprises a first auxiliary switch KX12 connected between the first voltage line of the first type P and the second auxiliary switching point CX2, a second auxiliary switch KX22 connected between the second voltage line of the first type N and said second auxiliary switching point CX2, and a third auxiliary switch KX32 connected between the third voltage line of the first type REF and said second auxiliary switching point CX2.

The converter device represented in FIG. 3 further comprises a transformer equipped with two windings N1, N2. Two free ends of these windings N1, N2 are respectively connected to the first point and to the second auxiliary switching point CX1, CX2. The other two ends of these winding N1, N2 are for their part connected to a common point which is itself connected to the main switching point CP.

Figure 4:
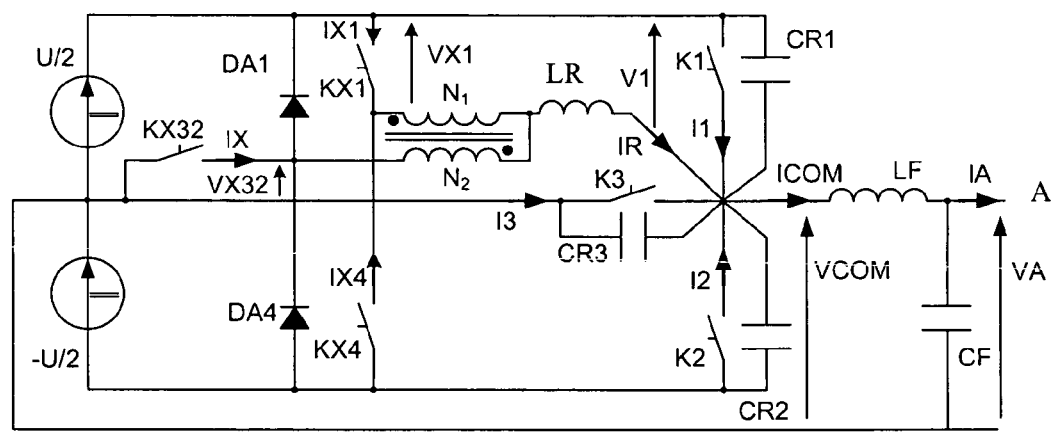
FIG. 4 represents a similar converter model to the one represented in FIG. 3 in which the first and second switch of the second auxiliary switching unit have been replaced by diodes.

The transformer used is generally an autotransformer, i.e. a transformer without insulation between the primary and secondary winding. The windings N1, N2 are generally reverse-wound. The main function of the transformer N1, N2 is to act as a voltage source to branch off the main current flowing via the main switching point CP before one of the main switches K1, K2, K3 closes. The variation of the current IR flowing in the transformer N1, N2 is generally governed by a resonance phenomenon due to the leakage inductance of the transformer N1, N2, to which there can be added the inductance of an inductive component LR connected between the point common of the windings N1, N2 and the main switching point CP (FIG. 4). The voltage at the terminals of the main switches K1, K2, K3 can therefore be cancelled by a resonance phenomenon between the leakage inductance of the transformer, possibly the inductance LR, and the capacitors CR1, CR2, CR3. The power losses on closing of the main switches can in this way be reduced. The capacitors CR1, CR2, CR3 also enable the power losses on opening of the main switches K1, K2, K3 to be reduced.

The converter device enables the auxiliary switches KX1, KX4, KX12, KX22, KX32 of the first and second auxiliary switching units to be opened under zero current. The converter device also enables these auxiliary switches KX1, KX4, KX12, KX22, KX32 to be closed with a controlled variation of the current flowing in said switches, by means of the leakage inductance of the transformer N1, N2.

In the embodiment represented in FIG. 4, the first and second switch of the second auxiliary switching unit have been replaced by diodes. An inductance LR has also been added between the common point of windings N1, N2 of the transformer and the main switching point CP. This inductance LR can correspond to the transformer leakage inductance, in which case FIG. 4 shows a model of the transformer and the inductance LR does not correspond to a particular inductive component. In this case, the common point of the transformer windings N1, N2 is connected directly to the main switching point CP. The inductance LR represented in FIG. 4 can also correspond to a real component. In the latter case, the inductance LR is added to the leakage inductance of the transformer, and the common point of the transformer windings N1, N2 is connected to the main switching point CP by means of this inductance LR. In all the embodiments described in the following, an inductance LR can be connected between the common point of the transformer windings N1, N2 and the main switching point CP.

The diodes DA1, DA4 are used to protect the third auxiliary switch KX32 during demagnetization of the transformer N1, N2. This demagnetization is permitted when the voltage VCOM at the main switching point CP is zero. In this way, a very weak magnetization current IR is required, which enables power losses during switchings to be minimized.

The transformer windings N1, N2 generally have a substantially equal number of turns which enables symmetric operation of the converter device to be obtained. It is also possible to use a transformer having a transformation ratio of less than or more than 1/2 which simplifies control of the device in the case of DC/AC conversions with a power factor of 1.

Figure 5:
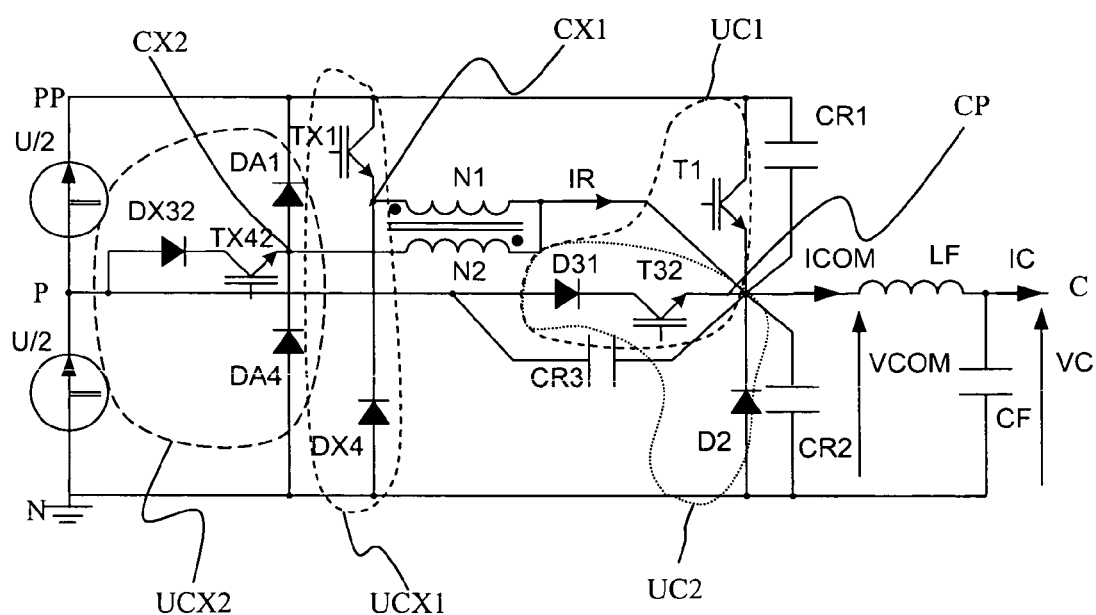
FIG. 5 represents a DC/DC converter according to the invention of buck type.

In the embodiment represented in FIG. 5, the converter device enables three DC voltage levels U, UREF, U/2 available on a first, second and third voltage line of a first type PP, REF, P to be converted into a DC voltage VC on a voltage line of a second type C. This type of converter is generally referred to as a buck DC/DC converter.

In the converter device represented in FIG. 5, the first main switch is a transistor T1 connected to the first voltage line of the first type PP and oriented to transfer power from said line to the main switching point CP, the second main switch being a diode D2 connected to the second voltage line of the first type REF and oriented to transfer power from said line to the main switching point CP. The third main switch for its part comprises a transistor T32 oriented to transfer power from the third voltage line of the first type P to the main switching point CP and a diode D31 connected in series with said transistor and oriented in the same way.

As far as the first auxiliary switching unit UCX1 of the converter device represented in FIG. 5 is concerned, the first auxiliary switch is a transistor TX1 oriented to transfer power from the first voltage line of the first type PP to the first auxiliary switching point CX1, the second auxiliary switch being a diode DX4 oriented to transfer power from the second voltage line of the first type REF to said first auxiliary switching point CX1.

As far as the second auxiliary switching unit UCX2 of the converter device represented in FIG. 5 is concerned, the first auxiliary switch is a diode DA1 oriented to transfer power from the second auxiliary switching point CX2 to the first voltage line of the first type PP, the second auxiliary switch being a diode DA4 oriented to transfer power from the second voltage line of the first type REF to said second auxiliary switching point CX2. The third auxiliary switch of said second auxiliary switching unit UCX2 for its part comprises a transistor TX42 oriented to transfer power from the third voltage line of the first type P to the second auxiliary switching point CX2 and a diode DX32 connected in series with said transistor and oriented in the same way.

Figure 6:
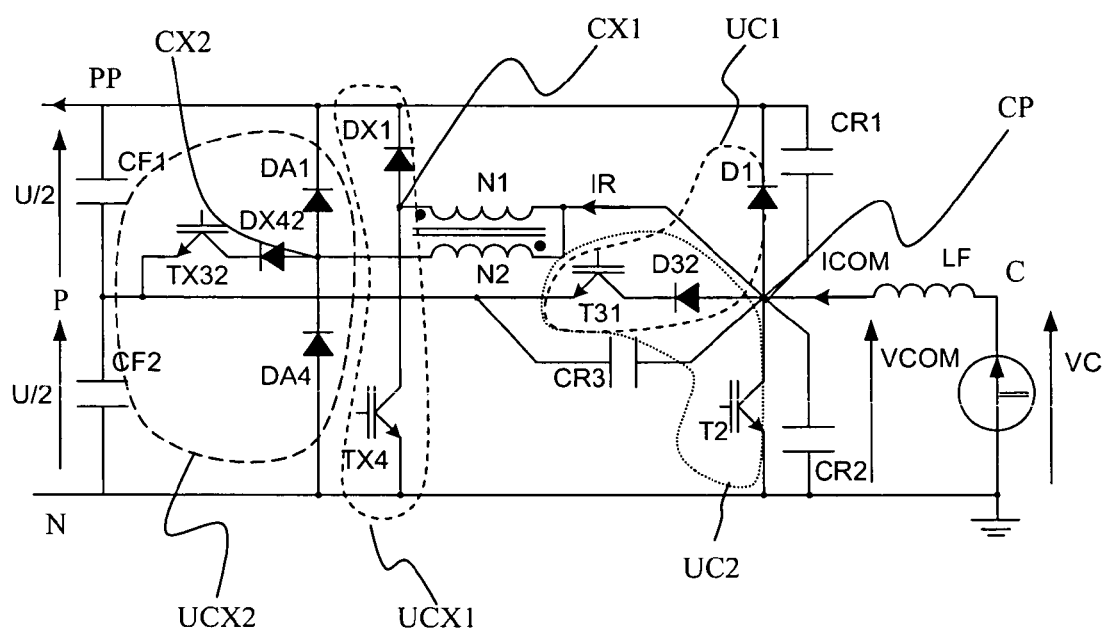
FIG. 6 represents a DC/DC converter according to the invention of boost type.

In the embodiment represented in FIG. 6, the converter device enables a DC voltage VC available on a voltage line of a second type C to be converted into three DC voltage levels U, UREF, U/2 available on a first, second and third voltage line of a first type PP, REF, P. This type of converter is generally referred to as a boost DC/DC converter.

In the converter device represented in FIG. 6, the first main switch is a diode D1 connected to the first voltage line of the first type PP and oriented to transfer power from the main switching point CP to said line, the second main switch being a transistor T2 connected to the second voltage line of the first type REF and oriented to transfer power from said main switching point CP to said line. The third main switch for its part comprises a transistor T31 oriented to transfer power from the main switching point CP to the third voltage line of the first type P and a diode D32 connected in series with said transistor and oriented in the same way.

As far as the first auxiliary switching unit UCX1 of the converter device represented in FIG. 6 is concerned, the first auxiliary switch is a diode DX1 oriented to transfer power from the first auxiliary switching point CX1 to the first voltage line of the first type PP, the second auxiliary switch being a transistor TX4 oriented to transfer power from said first auxiliary switching point CX1 to the second voltage line of the first type REF.

As far as the second auxiliary switching unit UCX2 of the converter device represented in FIG. 6 is concerned, the first auxiliary switch is a diode DA1 oriented to transfer power from the second auxiliary switching point CX2 to the first voltage line of the first type PP, the second auxiliary switch being a diode DA4 oriented to transfer power from the second voltage line of the first type REF to said second auxiliary switching point CX2. The third auxiliary switch of the second auxiliary switching unit UCX2 for its part comprises a transistor TX32 oriented to transfer power from the second auxiliary switching point CX2 to the third voltage line of the first type P and a diode DX42 connected in series with said transistor and oriented in the same way.

Figure 7:
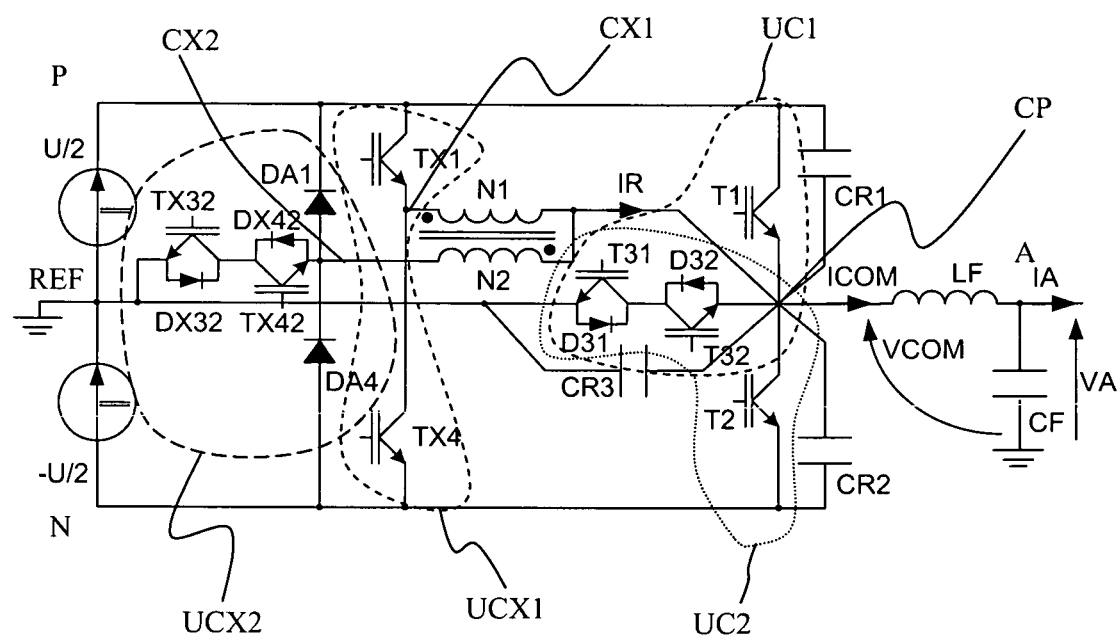
FIG. 7 represents an inverter according to the invention comprising a power factor of 1.

In the embodiment represented in FIG. 7, the converter device enables three DC voltage levels U/2, −U/2, UREF available on a first, second and third voltage line of a first type P, N, REF to be converted into an AC voltage VA on a voltage line of a second type A. This converter is a DC/AC inverter with a power factor of 1.

In the converter device represented in FIG. 7, the first main switch is a transistor T1 connected to the first voltage line of the first type P and oriented to transfer power from said line to the main switching point CP, the second main switch being a transistor T2 connected to the second voltage line of the first type N and oriented to transfer power from said main switching point CP to said line. The third main switch for its part comprises two transistors T31, T32 oriented in opposite directions and two diodes D31, D32 respectively connected in parallel on said transistors, each of said diodes being oriented to be conducting when the transistor in parallel with which it is connected is reverse-biased.

As far as the first auxiliary switching unit UCX1 of the converter device represented in FIG. 7 is concerned, the first auxiliary switch is a transistor TX1 oriented to transfer power from the first voltage line of the first type P to the first auxiliary switching point CX1, the second auxiliary switch being a transistor TX4 oriented to transfer power from said first auxiliary switching point CX1 to the second voltage line of first type N.

As far as the second auxiliary switching unit UCX2 of the converter device represented in FIG. 7 is concerned, the first auxiliary switch is a diode DA1 oriented to transfer power from the second auxiliary switching point CX2 to the first voltage line of first type P, the second auxiliary switch of said second auxiliary switching unit being a diode DA4 oriented to transfer power from the second voltage line of the first type N to said second auxiliary switching point CX2. The third auxiliary switch of said second auxiliary switching unit UCX2 for its part comprises two transistors TX32, TX42 oriented in opposite directions and two diodes DX32, DX42 respectively connected in parallel on said transistors, each of said diodes being oriented to be conducting when the transistor in parallel with which it is connected is reverse-biased.

Figure 8:
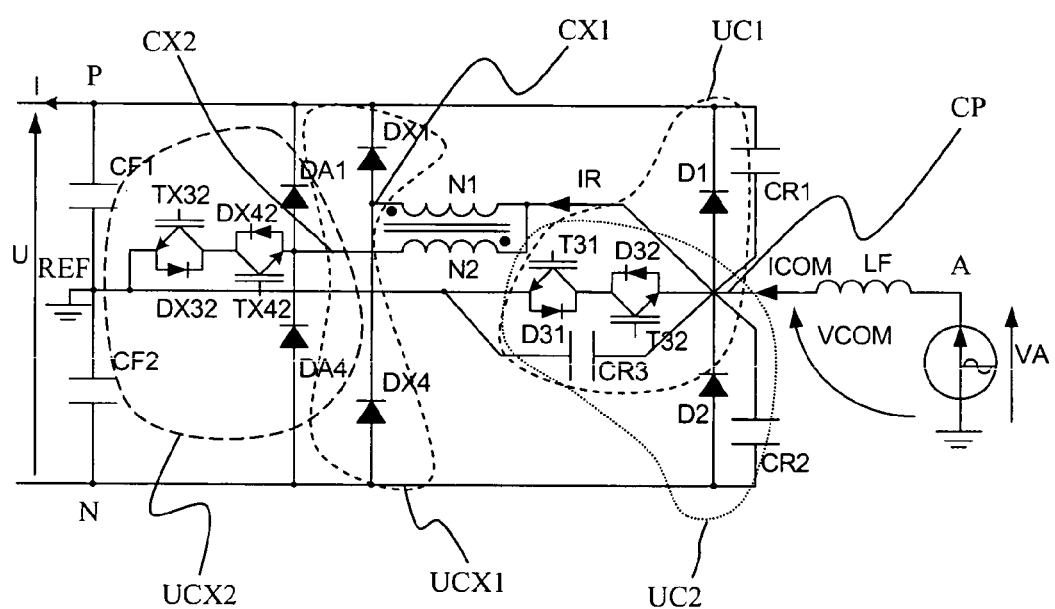
FIG. 8 represents a rectifier according to the invention enabling power factor correction.

In the embodiment represented in FIG. 8, the converter device enables an AC voltage VA available on a voltage line of a second type A to be converted into three DC voltage levels U/2, −U/2, UREF on a first, second and third voltage line of a first type P, N, REF. This converter is an AC/DC rectifier with power factor correction.

In the converter device represented in FIG. 8, the first main switch is a diode Di connected to the first voltage line of first type P and oriented to transfer power from the main switching point CP to said line, the second main switch being a diode D2 connected to the second voltage line of first type N and oriented to transfer power from said line to said main switching point CP. The third main switch for its part comprises two transistors T31, T32 oriented in opposite directions and two diodes D31, D32 connected in parallel respectively on said transistors, each of said diodes being oriented to be conducting when the transistor in parallel with which it is connected is reverse-biased.

As far as the first auxiliary switching unit UCX1 of the converter device represented in FIG. 8 is concerned, the first auxiliary switch is a diode DX1 oriented to transfer power from the first auxiliary switching point CX1 to the first voltage line of first type P, the second auxiliary switch being a diode DX4 oriented to transfer power from the second voltage line of first type N to said first auxiliary switching point CX1.

As far as the second auxiliary switching unit UCX2 of the converter device represented in FIG. 8 is concerned, the first auxiliary switch is a diode DA1 oriented to transfer power from the second auxiliary switching point CX2 to the first voltage line of first type P, the second auxiliary switch being a diode DA4 oriented to transfer power from the second voltage line of first type N to said second auxiliary switching point CX2. The third auxiliary switch of the second auxiliary switching unit UCX2 for its part comprises two transistors TX32, TX42 oriented in opposite directions and two diodes DX32, DX42 respectively connected in parallel on said transistors, each of said diodes being oriented to be conducting when the transistor in parallel with which it is connected is reverse-biased.

Figure 9:
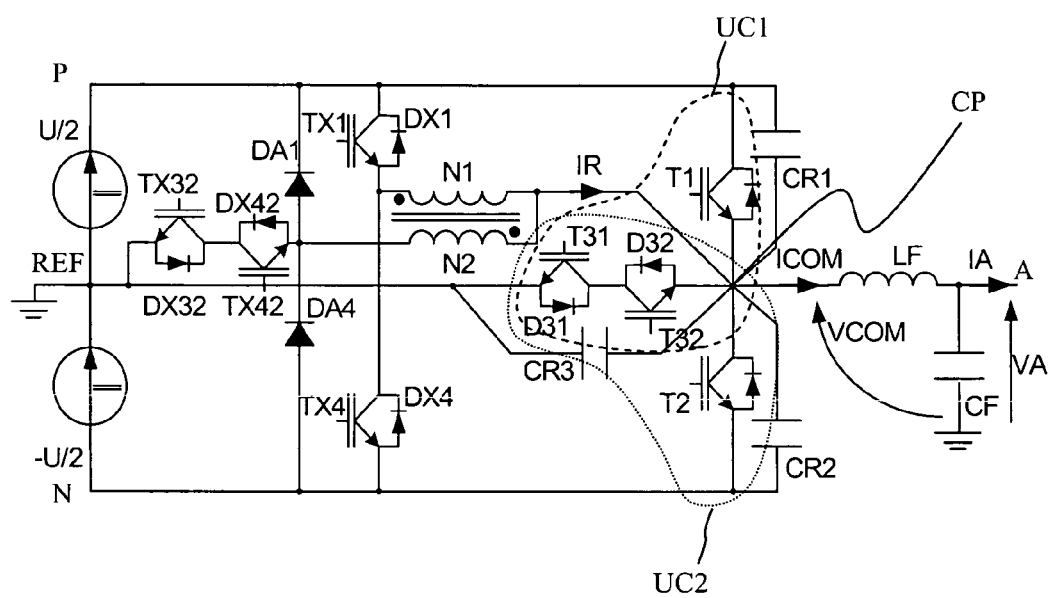
FIG. 9 represents a reversible converter according to the invention enabling operation in inverter mode or in rectifier mode.

In the embodiment represented in FIG. 9, the converter device enables three DC voltage levels U/2, –U/2, UREF available on a first, second and third voltage line of a first type P, N, REF to be converted into an AC voltage VA on a voltage line of a second type A, in either direction. This DC/AC converter is reversible and enables operation in inverter mode or in rectifier mode.

In the converter device represented in FIG. 9, the first main switch comprises a transistor T1 oriented to transfer power from the first voltage line of the first type P to the main switching point CP and a diode D1 connected in parallel on said transistor and oriented to be conducting when said transistor is reverse-biased. The second main switch comprises a transistor T2 oriented to transfer power from the main switching point CP to the second voltage line of the first type N and a diode D2 connected in parallel on said transistor and oriented be conducting when said transistor is reverse-biased. The third main switch for its part comprises two transistors T31, T32 oriented in opposite directions and two diodes D31, D32 respectively connected in parallel on said transistors, each of said diodes being oriented to be conducting when the transistor in parallel with which it is connected is reverse-biased.

As far as the first auxiliary switching unit UCX1 of the converter device represented in FIG. 9 is concerned, the first auxiliary switch comprises a transistor TX1 oriented to transfer power from the first voltage line of first type P to the first auxiliary switching point CX1 and a diode DX1 connected in parallel on said transistor and oriented to be conducting when said transistor is reverse-biased. The second auxiliary switch of said first auxiliary switching unit UCX1 comprises a transistor TX4 oriented to transfer power from said first main switching point CX1 to the second voltage line of first type N and a diode DX4 connected in parallel on said transistor and oriented to be conducting when said transistor is reverse-biased.

As far as the second auxiliary switching unit UCX2 of the converter device represented in FIG. 9 is concerned, the first auxiliary switch is a diode DA1 oriented to transfer power from the second auxiliary switching point CX2 to the first voltage line of first type P, the second auxiliary switch being a diode DA4 oriented to transfer power from the second voltage line of first type N to said second auxiliary switching point CX2. The third auxiliary switch of said second auxiliary switching unit UCX2 for its part comprises two transistors TX32, TX42 oriented in opposite directions and two diodes DX32, DX42 respectively connected in parallel on said transistors, each of said diodes being oriented to be conducting when the transistor in parallel with which it is connected is reverse-biased.

Figure 2:
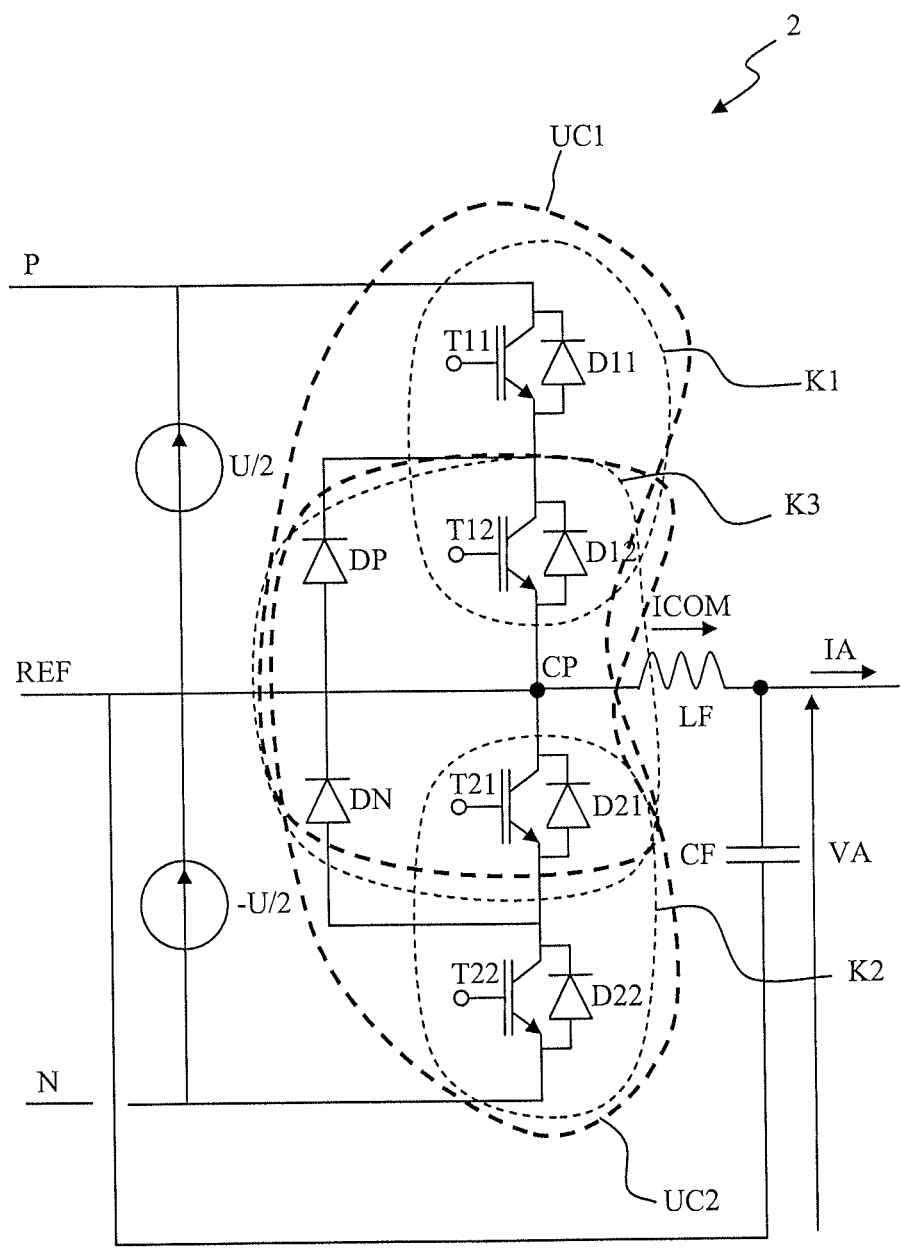
FIG. 2 represents a three-level converter according to the prior art presenting a "NPC" topology.
Figure 10:
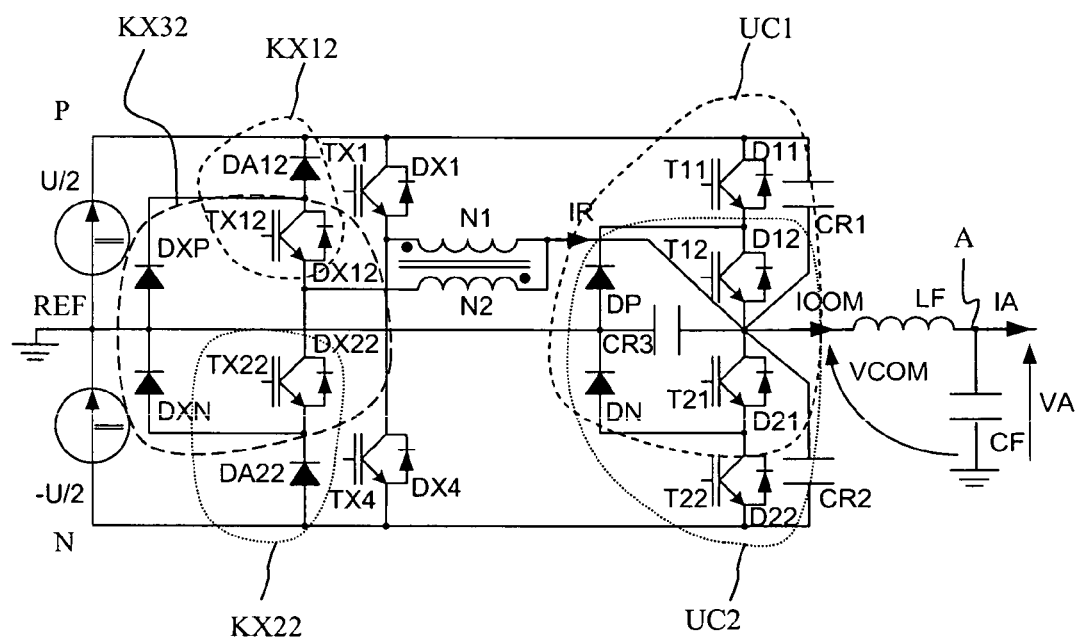
FIG. 10 represents a reversible converter according to the invention presenting a "NPC" topology.

With reference to FIG. 10, the converter device comprises the elements represented in FIG. 2 under the same reference numbers.

The converter device represented in FIG. 10 further comprises a first two-level auxiliary switching unit UCX1 connected between the first voltage line of the first type P, the second voltage line of the first type N, and a first auxiliary switching point CX1. This first auxiliary switching unit UCX1 comprises a first auxiliary switch connected between the first voltage line of first type P and the first auxiliary switching point CX1. This first auxiliary switch comprises a transistor TX1 oriented to transfer power from the first voltage line of first type P to the first auxiliary switching point CX1 and a diode DX1 connected in parallel on said transistor and oriented to be conducting when said transistor is reverse-biased. First auxiliary switching unit UCX1 further comprises a second auxiliary switch connected between the second voltage line of first type N and the first auxiliary switching point CX1. This second auxiliary switch of the first auxiliary switching unit comprises a transistor TX4 oriented to transfer power from the first auxiliary switching point CX1 to the second voltage line of first type N and a diode DX4 connected in parallel on said transistor and oriented to be conducting when said transistor is reverse-biased.

The converter device represented in FIG. 10 further comprises a second three-level auxiliary switching unit UCX2 connected between the first voltage line of first type P, the second voltage line of first type N, the third voltage line of first type REF and a second auxiliary switching point CX2.

This second auxiliary switching unit UCX2 of the converter device represented in FIG. 10 comprises a first auxiliary switch (KX12) connected between the first voltage line of first type P and the second auxiliary switching point CX2. This first auxiliary switch KX12 comprises a first diode DA 12 connected to the first voltage line of first type P and oriented to transfer power from the second auxiliary switching point CX2 to said line, a first transistor TX12 connected in series with said first diode and oriented in an opposite direction, and a second diode DX12 connected in parallel on said first transistor and oriented to be conducting when said first transistor is reverse-biased.

The second auxiliary switching unit UCX2 of the converter device represented in FIG. 10 comprises a second auxiliary switch KX22 connected between the second voltage line of first type N and the second auxiliary switching point CX2. This second auxiliary switch KX22 comprises a first diode DA22 connected to the second voltage line of the first type and oriented to transfer power from said line to said second auxiliary switching point CX2, a first transistor TX22 connected in series with said first diode and oriented in an opposite direction, and a second diode DX22 connected in parallel on said first transistor and oriented to be conducting when said first transistor is reverse-biased.

The second auxiliary switching unit UCX2 of the converter device represented in FIG. 10 comprises a third auxiliary switch KX32 connected between the third voltage line of first type REF and the second auxiliary switching point CX2. This third switch KX32 comprises the above-mentioned first transistors TX 12, TX22, the above-mentioned second diodes DX12, DX22, and diodes DXP, DXN connected between the third voltage line of first type REF and connection lines between said first and said second diodes.

The converter device represented in FIG. 10 further comprises a transformer equipped with two windings N1, N2. Two free ends of these windings N1, N2 are respectively connected to the first point and the second auxiliary switching point CX1, CX2. The other two ends of these windings N1, N2 are for their part connected to a common point which is itself connected to the main switching point CP.

Figure 11A:
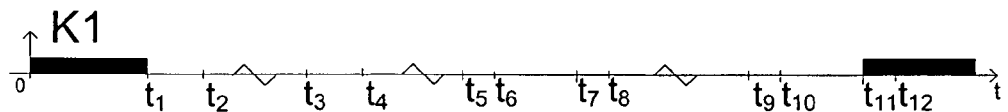
FIGS. 11A to 11Q are time diagrams illustrating operation of the converter device represented in FIG. 4.
Figure 11B:
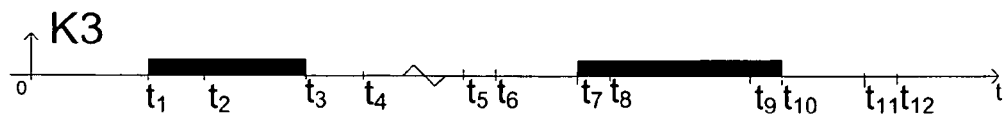
Figure 11C:
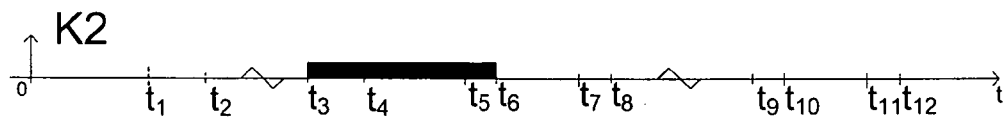
Figure 11D:
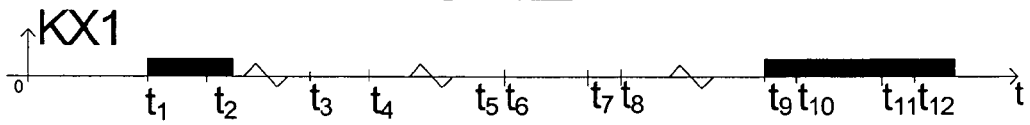
Figure 11E:
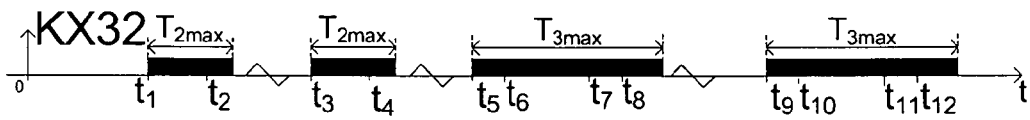
Figure 11F:
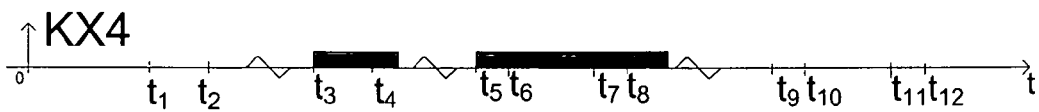
Figure 11G:
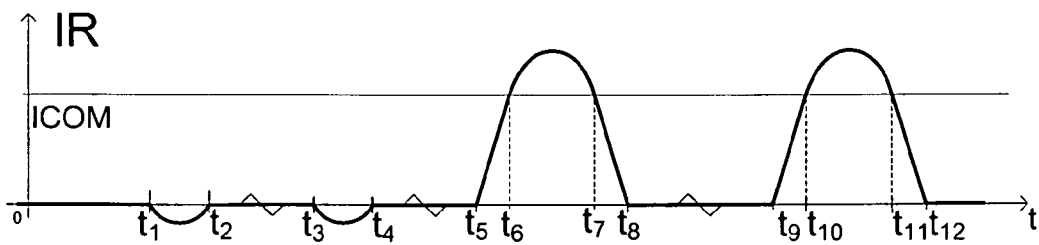

Operation of the converter device represented in FIG. 4 is described in the following with reference to FIGS. 11A to 11Q. It should be noted that the detailed operation of the embodiments represented in FIGS. 5 to 10 can easily be derived from the following description by referring to the embodiment represented in FIG. 4.

Figure 11H:
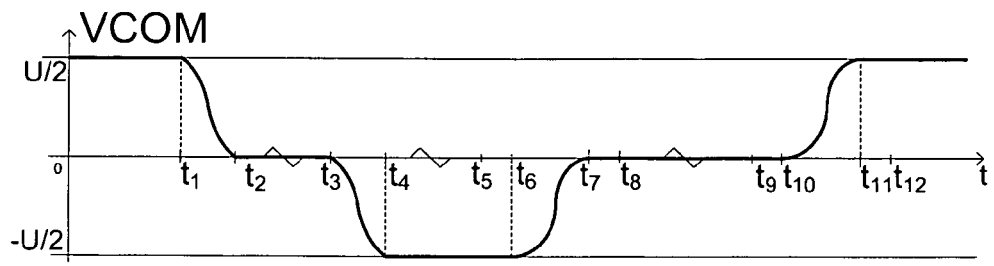

Before a time t1, only the first main switch K1 is closed (FIG. 11) and the voltage VCOM1 on the main switching point CP is equal to the voltage on the first voltage line of first type P, i.e. U/2 (FIG. 11H).

At a time t1, the first main switch K1 is open, whereas the third main switch K3 is closed (FIGS. 11A and 11B). At the same time, the first auxiliary switch KX1 of the first auxiliary switching unit UCX1 and the third auxiliary switch KX32 of the second auxiliary switching unit UCX2 are closed (FIGS. 11D and 11E) and a negative current IR flows in the transformer N1, N2 (FIG. 11G). The third and second capacitor CR3, CR2 discharge into the transformer N1, N2, whereas the first capacitor CR1 charges (FIG. 11J). A resonance phenomenon thereby occurs between the inductance LR, the first, second and third capacitor CR1, CR2, CR3, until the voltage VCOM on the main switching point CP becomes equal to the voltage on the third voltage line of first type REF, i.e. the reference voltage UREF (FIG. 11H). This resonance phenomenon is accompanied by a slow variation of the voltage VCOM on the main switching point CP, which enables the first main switch K1 to be opened under a controlled voltage level (FIG. 11J).

Figure 11I:
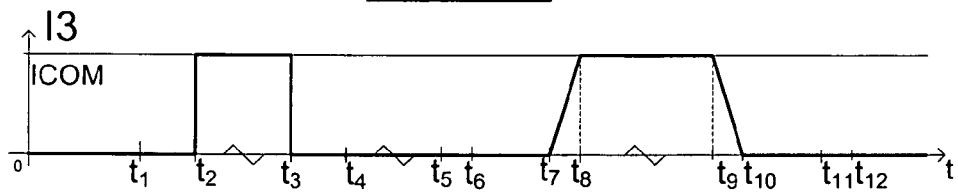
Figure 11J:
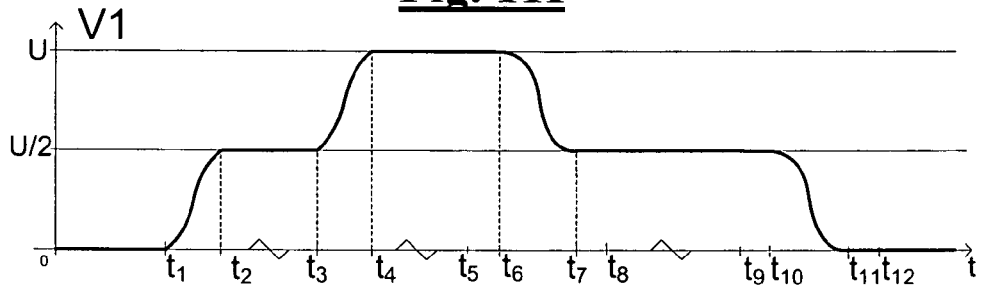
Figure 11K:
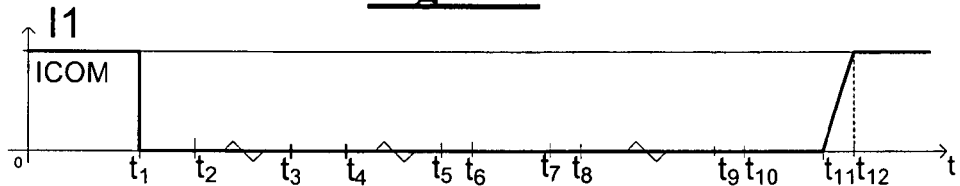

At a time t2, the voltage VCOM on the main switching point CP is equal to the voltage on the third voltage line of first type REF, i.e. the reference voltage UREF (FIG. 11H) and the current I3 flowing through the third main switch K3 is essentially equal to the load current (FIG. 11I). After a time period T2MAX counted from closing of the first auxiliary switch KX1 of the first auxiliary switching unit UCX1 and of the third auxiliary switch KX32 of the second auxiliary switching unit UCX2, these two switches are again opened. The period T2MAX has been chosen so that, on expiry of this time period, the voltage VCOM on the main switching point CP is equal to the voltage on the third voltage line of first type REF, i.e. the reference voltage UREF. Closing of the first auxiliary switch KX1 of the first auxiliary switching unit UCX1 and of the third auxiliary switch KX32 of the second auxiliary switching unit UCX2 is thereby performed with currents respectively referenced IX1 and IX32 which are zero (FIGS. 11N and 11Q), which enables power losses to be limited.

At a time t3, the third main switch K3 is open, whereas the second main switch K2 is closed (FIGS. 11B and 11C). At the same time, the third auxiliary switch KX32 of the second auxiliary switching unit UCX2 and the second auxiliary switch KX4 of the first auxiliary switching unit UCX1 are closed (FIGS. 11E and 11F), and a negative current IR flows in the transformer N1, N2 (FIG. 11G). The second capacitor CR2 discharges into the transformer N1, N2, whereas the first and third capacitor CR1, CR3 charge (FIG. 11J). A resonance phenomenon again occurs between the inductance LR, the first, second and third capacitor CR1, CR2, CR3, until the voltage VCOM on the main switching point CP becomes equal to the voltage on the second voltage line of first type N, i.e. −U/2 (FIG. 11H). This resonance phenomenon is accompanied by a slow variation of the voltage VCOM on the main switching point CP, which enables the third main switch K3 to be opened under a controlled voltage level.

Figure 11L:
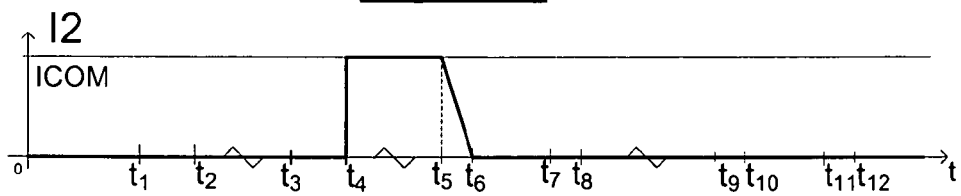
Figure 11M:
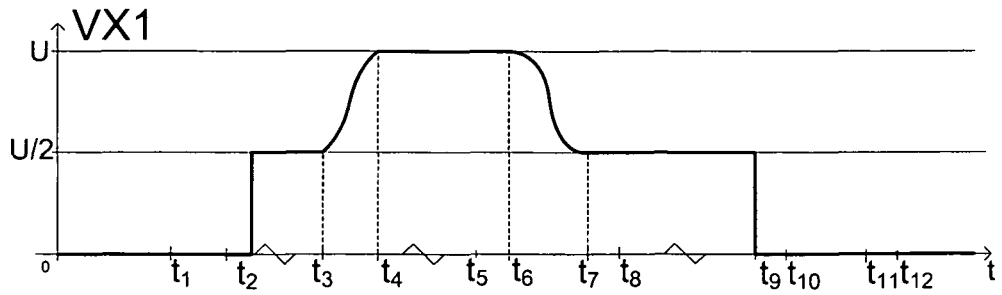
Figure 11N:
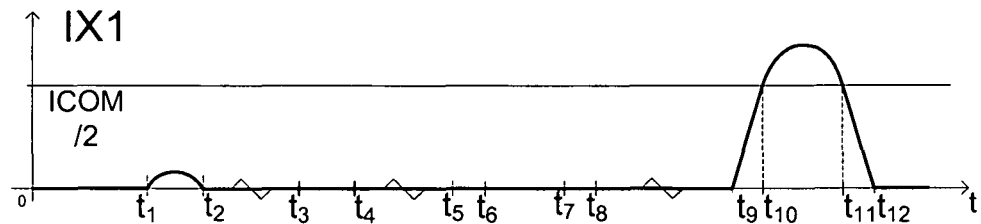
Figure 11O:
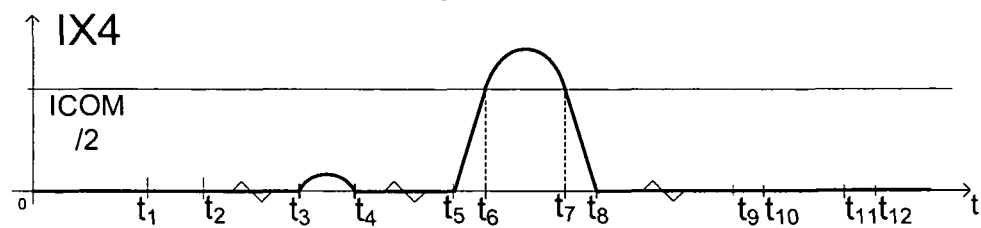
Figure 11P:
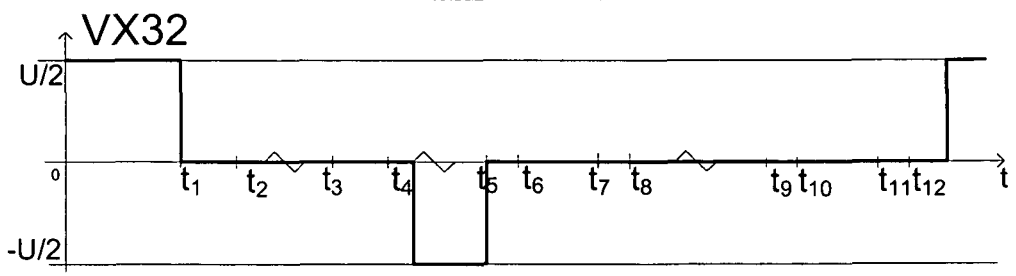
Figure 11Q:
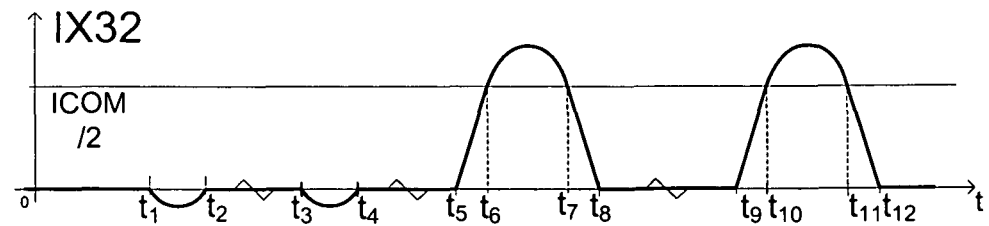

At a time t4, the voltage VCOM on the main switching point CP is equal to the voltage on the second voltage line of first type N, i.e. −U/2 (FIG. 11H) and the current I2 flowing through the second main switch K2 is essentially equal to the load current (FIG. 11L). After a time period T2MAX counted from closing of the third auxiliary switch KX32 of the second auxiliary switching unit UCX2 and of the second auxiliary switch KX4 of the first auxiliary switching unit UCX1, these two switches are again opened. The time period T2MAX has been chosen so that, on expiry of this time period, the voltage VCOM on the main switching point CP is equal to the voltage on the second voltage line of first type N, i.e. −U/2. Opening of the third auxiliary switch KX32 of the second auxiliary switching unit UCX2 and of the second auxiliary switch KX4 of the first auxiliary switching unit UCX1 is thus performed under currents respectively referenced KX32 and DC4 which are zero (FIGS. 11Q and 11O). Opening of these switches therefore takes place under zero current which enables power losses to be limited.

At a time t5, before closing of the third main switch K3, the third auxiliary switch KX32 of the second auxiliary switching unit UCX2 and the second auxiliary switch KX4 of the first auxiliary switching unit UCX1 are closed (FIGS. 11E and 11F), and a positive current IR begins to flow in the transformer N1, N2 (FIG. 11G) increasing progressively (FIG. 11G) while the value of the current I2 flowing in the second main switch K2 decreases progressively (FIG. 11L).

At a time t6, the current IR flowing in the transformer N1, N2 reaches a value corresponding to the current flowing in the load ICOM (FIG. 11G) and the value of the current I2 flowing in the second main switch K2 is cancelled (FIG. 11L). At the same time, the second main switch K2 is open whereas the current I2 is zero, which enables power losses to be limited. The third and first capacitor CR3, CR1 discharge into the transformer N1, N2 (FIG. 11J) whereas the second capacitor CR2 charges. A resonance phenomenon thereby occurs between the inductance LR, the first, second and third capacitors CR1, CR2, CR3, until the voltage VCOM on the main switching point CP becomes equal to the voltage on the third voltage line of first type REF, i.e. the reference voltage UREF (FIG. 11H).

At a time t7, the voltage VCOM on the main switching point CP is equal to the reference voltage UREF (FIG. 11H). At the same time, the third main switch K3 is closed (FIGS. 11B) under zero voltage (FIG. 11H), which enables power losses to be limited. As soon as the third main switch K3 is closed, the resonance phenomenon between the inductance LR, the first, second and third capacitor CR1, CR2, CR3 is stopped and the current IR flowing in the transformer N1, N2 decreases until it is cancelled out (FIG. 11G), whereas the current I3 flowing in the third main switch K3 increases (FIG. 11I).

At a time t8, the voltage VCOM on the main switching point CP is equal to the voltage on the third voltage line of first type REF, i.e. the reference voltage UREF (FIG. 11H) and the current I3 flowing through the third main switch K3 is essentially equal to the load current (figure 11I). After a time period T3MAX counted from closing of the third auxiliary switch KX32 of the second auxiliary switching unit UCX2 and of the second auxiliary switch KX4 of the first auxiliary switching unit UCX1, these two switches are again opened. The time period T3MAX has been chosen so that, on expiry of this period, the current IR flowing in the transformer N1, N2 is cancelled out. Closing of the third auxiliary switch KX32 of the second auxiliary switching unit UCX2 and of the second auxiliary switch KX4 of the first auxiliary switching unit UCX1 is thereby performed under currents respectively referenced IX32 and IX4 which are zero (FIGS. 11Q and 11O), which enables power losses to be limited.

At a time t9, before closing of the first main switch K1, the first auxiliary switch KX1 of the first auxiliary switching unit UCX1 and the third auxiliary switch KX32 of the second auxiliary switching unit UCX2 are closed (FIGS. 11D and 11E), and a positive current IR begins to flow in the transformer N1, N2 increasing progressively (FIG. 11G) while the value of the current I3 flowing in the third main switch K3 decreases progressively (FIG. 11I).

At a time t10, the current IR flowing in the transformer N1, N2 reaches a value corresponding to the current flowing in the load ICOM (FIG. 11G) and the current I3 flowing in the third main switch K3 is cancelled out (FIG. 11I). At the same time, the third main switch K3 is open whereas the current 13 is zero, which enables power losses to be limited. The second and third capacitor CR2, CR3 charge into the transformer N1, N2 (FIG. 11J), whereas the first capacitor CR1 discharges. A resonance phenomenon thereby occurs between the inductance LR, the first, second and third capacitors CR1, CR2, CR3, until the voltage VCOM on the main switching point CP becomes equal to the voltage on the first voltage line of first type P, i.e. U/2 (FIG. 11H).

At a time t11, the voltage VCOM on the main switching point CP is equal to the voltage U/2 on the first voltage line of the first type (FIG. 11H) and the voltage V1 at the terminals of the first main switch K1 reaches a zero value (FIG. 11J). At the same time, the first main switch K1 is closed (FIGS. 11A) under zero voltage (FIG. 11I), which enables power losses to be limited. As soon as the first main switch K1 is closed, the resonance phenomenon between the inductance LR, the first, second and third capacitors CR1, CR2, CR3 is stopped and the current IR flowing in the transformer N1, N2 decreases until it is cancelled out (FIG. 11G), whereas the current I1 flowing in the first main switch K1 increases (FIG. 11K).

At a time t12, the voltage VCOM on the main switching point CP is equal to the voltage on the first voltage line of first type P, i.e. U/2 (FIG. 11H) and the load current is essentially equal to the current I1 flowing through the first main switch K1 (FIG. 11K). After a time period T3MAX counted from closing of the first auxiliary switch KX1 of the first auxiliary switching unit UCX1 and of the third auxiliary switch KX32 of the second auxiliary switching unit UCX2, these two switches are again opened. The time period T3MAX has been chosen so that, on expiry of this time period, the current IR flowing in the transformer N1, N2 is cancelled out. Closing of the first auxiliary switch KX1 of the first auxiliary switching unit UCX1 and of the third auxiliary switch KX32 of the second auxiliary switching unit UCX2 is thereby performed under currents respectively referenced IX1 and IX32 which are zero (FIGS. 11N and 11Q), which enables power losses to be limited.

Figure 12:
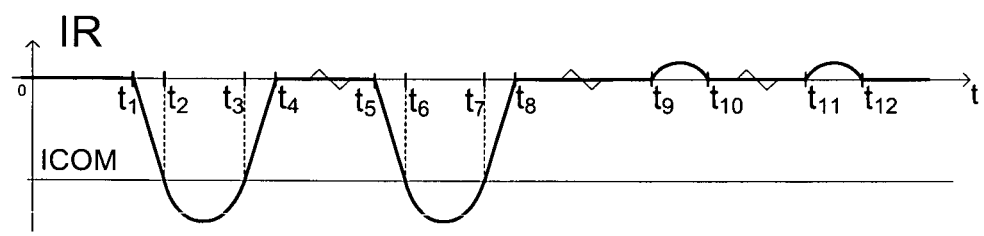
FIG. 12 is a time diagram of the current flowing in the transformer to illustrate operation of the converter device represented in FIG. 4 when the current in the load is negative.

In the case where the load current ICOM is negative, the variations of the current IR flowing in the transformer N1, N2 are represented in FIG. 12, and the above description of operation applies in the same way.

The converter according to the invention thereby enables power losses to be limited when switching of the main switches K1, K2, K3 takes place, whatever the power factor of the load.

The converter devices described in the foregoing can be used in an uninterruptible power supply 101 such as the one represented in FIG. 12. This uninterruptible power supply comprises a power supply input 102 on which a variable input voltage from a first three-phase power system is applied. The uninterruptible power supply comprises a rectifier 103, said rectifier being connected between the power supply input 102 on the one hand and two output lines 104 or substantially DC voltage busses on the other hand. The uninterruptible power supply comprises an inverter 106 corresponding to one of the converter devices described in the foregoing, said inverter being connected between the output lines 104 and an output 107 designed to supply a secured three-phase AC voltage to a load 108. The DC voltage bus 104 is also connected to a battery 109 by means of a DC/DC converter 110.

Figure 13:
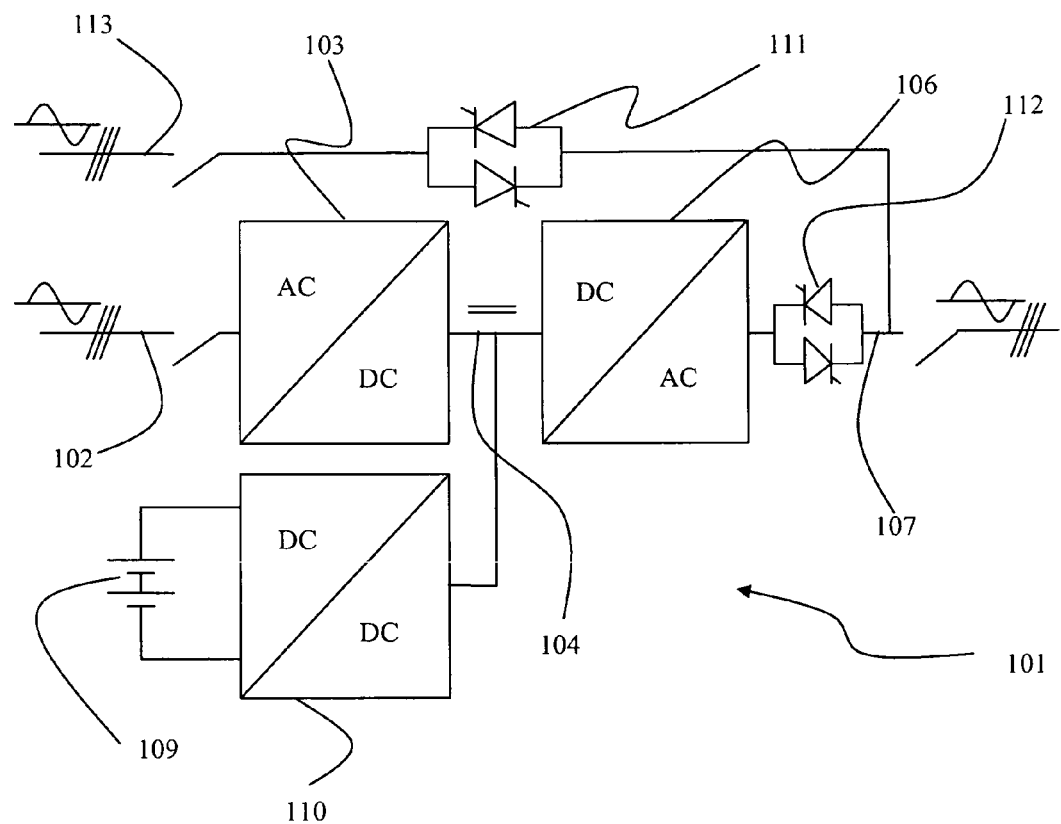
FIG. 13 represents an uninterruptible power supply according to the invention.

As can be seen in FIG. 13, solid-state switches 111 and 112 enable selection to be made between the power supply input 102 of the first three-phase power system and a power supply input 113 of a second power system which is also three-phase. It is thereby possible to supply the load by means of the first secured power system via the uninterruptible power supply 101, and if required to switch over to the second power system.

The invention claimed is:

1. A converter device for enabling electric voltage levels available on first, second and third voltage lines of a first type to be transformed into a voltage on a voltage line of a second type, in either direction, said device comprising:
   a first main switching unit connected to a first voltage line of a first type and equipped with a first main switch;
   a second main switching unit connected to a second voltage line of the first type and equipped with a second main switch;
   a main switching point connected to a voltage line of a second type and connected to said first and said second main switching units; and
   a third main switch common to said first and to said second main switching units, said third main switch being connected between said main switching point and a third voltage line of the first type;
   first, second and third capacitors connected between said main switching point and respectively said first, said second and said third voltage lines of the first type;
   a first auxiliary switching unit connected by individual auxiliary switches between the first voltage line of the first type, the second voltage line of the first type, and a first auxiliary switching point, respectively;
   a second auxiliary switching unit connected by individual auxiliary switches between the first voltage line of the first type, the second voltage line of the first type, the third voltage line of the first type and a second auxiliary switching point, respectively; and
   a transformer having windings each having one free end and one end connected to said main switching point, the two free ends being respectively connected to said first point and said second auxiliary switching point.

2. The device according to claim 1, wherein the first auxiliary switching unit comprises:
   a first auxiliary switch of said first auxiliary switching unit connected between the first voltage line of the first type and the first auxiliary switching point, and
   a second auxiliary switch of said first auxiliary switching unit connected between the second voltage line of the first type and said first auxiliary switching point.

3. The device according to claim 2, wherein the second auxiliary switching unit comprises:
   a first auxiliary switch of said second auxiliary switching unit connected between the first voltage line of the first type and the second auxiliary switching point,
   a second auxiliary switch of said second auxiliary switching unit connected between the second voltage line of the first type and said second auxiliary switching point, and a third auxiliary switch of said second auxiliary switching unit connected between the third voltage line of the first type and said second auxiliary switching point.

4. The device according to claim 3, wherein:
the first auxiliary switch of the second auxiliary switching unit is a diode for transferring power from the second auxiliary switching point to the first voltage line of the first type; and
the second auxiliary switch of said second auxiliary switching unit is a diode for transferring power from the second voltage line of the first type to said second auxiliary switching point.

5. The device according to claim 3, wherein:
the first main switch is a transistor connected to the first voltage line of the first type for transferring power from said line to the main switching point;
the second main switch is a diode connected to the second voltage line of the first type for transferring power from said line to the main switching point;
the third main switch comprises a transistor for transferring power from the third voltage line of the first type to said main switching point and a diode connected in series with said transistor and oriented in the same way;
the first auxiliary switch of the first auxiliary switching unit is a transistor for transferring power from the first voltage line of the first type to the first auxiliary switching point;
the second auxiliary switch of said first auxiliary switching unit is a diode for transferring power from the second voltage line of the first type to said first auxiliary switching point;
the first auxiliary switch of the second auxiliary switching unit is a diode for transferring power from the second auxiliary switching point to the first voltage line of the first type;
the second auxiliary switch of said second auxiliary switching unit is a diode for transferring power from the second voltage line of the first type to said second auxiliary switching point;
the third auxiliary switch of said second auxiliary switching unit comprises a transistor for transferring power from the third voltage line of the first type to said second auxiliary switching point and a diode connected in series with said transistor and oriented in the same way as the third auxiliary switch.

6. The device according to claim 3, wherein:
the first main switch is a diode connected to the first voltage line of the first type for transferring power from the main switching point to said line,
the second main switch is a transistor connected to the second voltage line of the first type for transferring power from said main switching point to said line,
the third main switch comprises a transistor for transferring power from said main switching point to the third voltage line of the first type and a diode connected in series with said transistor and oriented in the same way,
the first auxiliary switch of the first auxiliary switching unit is a diode for transferring power from the first auxiliary switching point to the first voltage line of the first type,
the second auxiliary switch of said first auxiliary switching unit is a transistor for transferring power from said first auxiliary switching point to the second voltage line of the first type,
the first auxiliary switch of the second auxiliary switching unit is a diode for transferring power from the second auxiliary switching point to the first voltage line of the first type,
the second auxiliary switch of said second auxiliary switching unit is a diode for transferring power from the second voltage line of the first type to said second auxiliary switching point,
the third auxiliary switch of said second auxiliary switching unit comprises a transistor for transferring power from said second auxiliary switching point to the third voltage line of the first type and a diode connected in series with said transistor and oriented in the same way as the third auxiliary switch.

7. The device according to claim 3, wherein:
the first main switch is a transistor connected to the first voltage line of the first type for transferring power from said line to the main switching point;
the second main switch is a transistor connected to the second voltage line of the first type for transferring power from said main switching point to said line;
the third main switch comprises two transistors in opposite directions and two diodes respectively connected in parallel on said transistors, each of said diodes for conducting when the transistor in parallel with which it is connected is reverse-biased;
the first auxiliary switch of the first auxiliary switching unit is a transistor for transferring power from the first voltage line of the first type to the first auxiliary switching point;
the second auxiliary switch of said first auxiliary switching unit is a transistor for transferring power from said first auxiliary switching point to the second voltage line of the first type;
the first auxiliary switch of the second auxiliary switching unit is a diode for transferring power from the second auxiliary switching point to the first voltage line of the first type;
the second auxiliary switch of said second auxiliary switching unit is a diode for transferring power from the second voltage line of the first type to said second auxiliary switching point;
the third auxiliary switch of said second auxiliary switching unit comprises two transistors in opposite directions and two diodes respectively connected in parallel on said transistors, each of said diodes for conducting when the transistor in parallel with which it is connected is reverse-biased.

8. The device according to claim 3, wherein:
the first main switch is a diode connected to the first voltage line of the first type for transferring power from the main switching point to said line,
the second main switch is a diode connected to the second voltage line of the first type for transferring power from said line to said main switching point,
the third main switch comprises two transistors oriented in opposite directions and two diodes respectively connected in parallel on said transistors, each of said diodes being oriented to be conducting when the transistor in parallel with which it is connected is reverse-biased,
the first auxiliary switch of the first auxiliary switching unit is a diode for transferring power from the first auxiliary switching point to the first voltage line of the first type,
the second auxiliary switch of said first auxiliary switching unit is a diode for transferring power from the second voltage line of the first type to said first auxiliary switching point,
the first auxiliary switch of the second auxiliary switching unit is a diode for transferring power from the second auxiliary switching point to the first voltage line of the first type, the second auxiliary switch of said second auxiliary switching unit is a diode for transferring power from the second voltage line of the first type to said second auxiliary switching point, the third auxiliary switch of said second auxiliary switching unit comprises two transistors oriented in opposite directions and two diodes respectively connected in parallel on said transistors, each of said diodes being oriented to be conducting when the transistor in parallel with which it is connected is reverse-biased.

9. The device according to claim 3, wherein:

the first main switch comprises a transistor oriented to transfer power from the first voltage line of the first type to the main switching point and a diode connected in parallel on said transistor and oriented to be conducting when said transistor is reverse-biased, the second main switch comprises a transistor oriented to transfer power from the main switching point to the second voltage line of the first type and a diode connected in parallel on said transistor and oriented to be conducting when said transistor is reverse-biased, the third main switch comprises two transistors oriented in opposite directions and two diodes respectively connected in parallel on said transistors, each of said diodes being oriented to be conducting when the transistor in parallel with which it is connected is reverse-biased, the first auxiliary switch of the first auxiliary switching unit comprises a transistor for transferring power from the first voltage line of the first type to the first auxiliary switching point and a diode connected in parallel on said transistor and oriented to be conducting when said transistor is reverse-biased, the second auxiliary switch of said first auxiliary switching unit comprises a transistor for transferring power from said first main switching point to the second voltage line of the first type and a diode connected in parallel on said transistor and oriented to be conducting when said transistor is reverse-biased, the first auxiliary switch of the second auxiliary switching unit is a diode for transferring power from the second auxiliary switching point to the first voltage line of the first type, the second auxiliary switch of said second auxiliary switching unit is a diode for transferring power from the second voltage line of the first type to said second auxiliary switching point, the third auxiliary switch of said second auxiliary switching unit comprises two transistors oriented in opposite directions and two diodes respectively connected in parallel on said transistors, each of said diodes being oriented to be conducting when the transistor in parallel with which it is connected is reverse-biased.

10. The device according to claim 1, wherein:

the first main switch comprises a first transistor connected to the first voltage line of the first type for transferring power from said line to the main switching point, a second transistor connected in series with said first transistor and oriented in the same direction, a first and second diode respectively connected in parallel on said first and said second transistor, each of said diodes being oriented to be conducting when the transistor in parallel with which it is connected is reverse-biased, the second main switch comprises a first transistor connected to the second voltage line of the first type for transferring power from said main switching point to said line, a second transistor connected in series with said first transistor and oriented in the same direction, a first and second diode respectively connected in parallel on said first and said second transistor, each of said diodes being oriented to be conducting when the transistor in parallel with which it is connected is reverse-biased, the third main switch comprises said second transistors, said second diodes connected between the third voltage line of the first type and connection lines between said first and said second transistors.

11. The device according to claim 10, wherein:

the first auxiliary switch of the first auxiliary switching unit comprises a transistor for transferring power from the first voltage line of the first type to the first auxiliary switching point and a diode connected in parallel on said transistor and oriented to be conducting when said transistor is reverse-biased, the second auxiliary switch of said first auxiliary switching unit comprises a transistor for transferring power from said first auxiliary switching point to the second voltage line of the first type and a diode connected in parallel on said transistor and oriented to be conducting when said transistor is reverse-biased.

12. The device according to claim 10, wherein:

the first auxiliary switch of said second auxiliary switching unit comprises a first diode connected to the first voltage line of the first type oriented to transfer power from the second auxiliary switching point to said line, a first transistor connected in series with said first diode and oriented in an opposite direction, and a second diode connected in parallel on said first transistor and oriented to be conducting when said transistor is reverse-biased, the second auxiliary switch of said second auxiliary switching unit comprises a first diode connected to the second voltage line of the first type oriented to transfer power from said line to said second auxiliary switching point, a first transistor connected in series with said first diode and oriented in an opposite direction, and a second diode connected in parallel on said first transistor and oriented to be conducting when said transistor is reverse-biased, the third switch of said second auxiliary switching unit comprises said first transistors, said second diodes connected between the third voltage line of the first type and connection lines between said first and said second diodes.

13. The device according to claim 1, wherein the transformer windings have a substantially equal number of turns.

14. An uninterruptible power supply comprising a power supply input on which an AC input voltage is applied, a rectifier connected to said input, two DC voltage lines connected on output of said rectifier, an inverter connected to said DC voltage lines and comprising an output designed to supply a voltage, wherein said inverter is a converter device according claim 1 and supplies a secured AC voltage from substantially DC voltages.

* * * * *